G. W. SAMPSON.

LOCKING NUT.

No. 10,476. Reissued May 6, 1884.

WITNESSES:

W. W. Hollingsworth

Edw. W. Byrn

INVENTOR:

G. W. Sampson

BY Munn & Co

ATTORNEYS.

UNITED STATES PATENT OFFICE.

GENERAL W. SAMPSON, OF SPRINGFIELD, IOWA.

LOCKING-NUT.

SPECIFICATION forming part of Reissued Letters Patent No. 10,476, dated May 6, 1884.

Original No. 289,146, dated November 27, 1883. Application for reissue filed February 4, 1884.

*To all whom it may concern:*

Be it known that I, GENERAL W. SAMPSON, of Springfield, Washington township, Keokuk county, and State of Iowa, have invented a new and Improved Locking-Nut, of which the following is a full, clear, and exact description.

The object of my invention is to furnish a locking-nut that shall be, with the exception of a slight movement to tighten, secure against any backward movement or loosening, and which can be readily turned forward for tightening.

Reference is to be had to the accompanying drawings, forming a part of this specification, in which similar letters of reference indicate corresponding parts in all the figures.

Figures 1 to 5 are detail views showing the various forms of construction.

A in all the figures is the nut, B the bolt to which the nut is applied, and C the locking dog or block fitted in a recess, *a*, at the under side of the nut, which recess opens into the central aperture of the nut, and is formed on its outer face curved or inclined eccentrically to the central aperture, so that the dog has two bearings—one against the surface of the bolt and the other upon the inclined side of the recess. The recess *a* is extended at one side in the backward direction to receive a spring, *b*, that bears upon the dog, so as to retain it in place and assist the locking movement.

Figure 2:
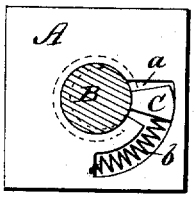
Figure 3:
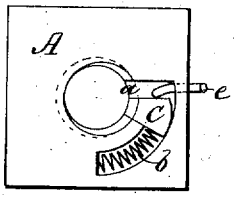

In Fig. 2, which is a cross-section, and Fig. 3 an inverted plan view, the dog C is of angular form, and formed at its ends so as to act on the incline and the surface of the bolt and locks by rolling and pivotal movements. The inner end is also formed with thread-sections to fit the thread of the bolt, so as to avoid injury to the thread.

For the purpose of releasing the dog, the nut is formed with a hole, *d*, at one side entering recess *a*, through which a key, *e*, is to be inserted, as illustrated in Fig. 3, and the dog pressed back with the key into the wider portion of the recess. The nut may then be turned backward.

Figure 1:
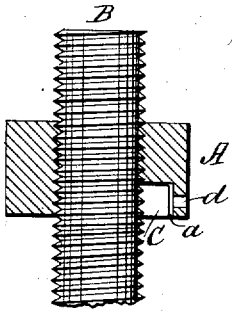
Figure 4:
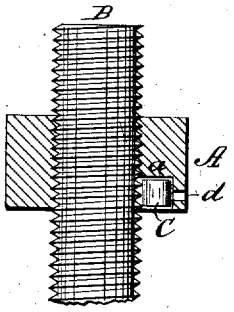
Figure 5:
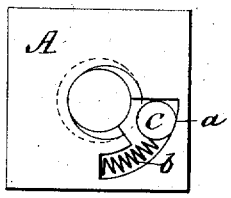

In the section, Fig. 4, and plan, Fig. 5, a dog C is shown in the form of a roller-cylinder.

By the construction described I provide for the secure locking of nuts against backward movement, and at the same time said construction admits of a forward movement.

Having thus described my invention, I claim as new and desire to secure by Letters Patent—

1. In lock-nuts, the combination of a dog or block and a spring acting on the dog with a nut having an inclined recess, whereby the dog is pressed against the surface of the bolt, substantially as shown and described.

2. The combination, with a nut having a recess, *a*, of dog C and spring *b*, substantially as described.

GENERAL W. SAMPSON.

Witnesses:
OLIF SAMPSON,
WILLIAM URIC.